(12) United States Patent
Bertolotti (10) Patent No.: US 9,004,867 B2
(45) Date of Patent: Apr. 14, 2015

(54) ROTOR FOR A WIND TURBINE

(75) Inventor: Fabio Bertolotti, Bad Bentheim (DE)

(73) Assignee: SSB Wind Systems GmbH & Co., KG, Salzbergen (DE)

( * ) Notice: Subject to any disclaimer, the term of this patent is extended or adjusted under 35 U.S.C. 154(b) by 385 days.

(21) Appl. No.: 13/499,586

(22) PCT Filed: Oct. 3, 2010

(86) PCT No.: PCT/EP2010/064699
§ 371 (c)(1),
(2), (4) Date: Mar. 30, 2012

(87) PCT Pub. No.: WO2011/042375
PCT Pub. Date: Apr. 14, 2011

(65) Prior Publication Data
US 2012/0189445 A1 Jul. 26, 2012

(30) Foreign Application Priority Data
Oct. 7, 2009 (DE) .......................... 10 2009 045 467

(51) Int. Cl.
*B63H 3/00* (2006.01)
*F03D 7/02* (2006.01)

(52) U.S. Cl.
CPC ............. *F03D 7/0224* (2013.01); *Y02E 10/721* (2013.01); *Y02E 10/723* (2013.01)

(58) Field of Classification Search
USPC .................................................. 416/155, 205
See application file for complete search history.

(56) References Cited

U.S. PATENT DOCUMENTS 4,349,184 A * 9/1982 Peterson et al. ............... 267/153
4,498,842 A * 2/1985 Fischer et al. ................. 416/155

(Continued)

FOREIGN PATENT DOCUMENTS

DE 199 48 997 A1 4/2001
DE 202004009839 * 12/2005

(Continued)

OTHER PUBLICATIONS

English Translation of the International Preliminary Report on Patentability (Chapter I of the Patent Cooperation Treaty) for PCT/EP2010/064699, issued Apr. 11, 2012.

(Continued)

*Primary Examiner* — Dwayne J White
*Assistant Examiner* — William Grigos
(74) *Attorney, Agent, or Firm* — Harness, Dickey & Pierce, P.L.C.

(57) ABSTRACT

The present disclosure relates to a rotor for a wind turbine (1), having a rotor hub (8), having at least one rotor blade (9) mounted on the rotor hub (8) so as to be rotatable about a blade axis (11). At least one threaded spindle mechanism (13) is positioned between the rotor hub (8) and the rotor blade (9) and is connected both to the rotor hub (8) and the rotor blade (9). The rotor blade (9) is adapted to be rotated relative to the rotor hub (8) about the blade axis (11) by means of an actuation of the threaded spindle mechanism (13). The threaded spindle mechanism (13) has a drive (22), an actuating element (31), a spindle nut (18) detachably coupled to the actuating element (31), and a threaded spindle (19) which can be rotated about the longitudinal axis (25) thereof by means of the drive (22) and which is detachably coupled to the drive (22), such that the threaded spindle (19) and the spindle nut (18) can be separated from the threaded spindle mechanism (13).

20 Claims, 6 Drawing Sheets

(56) References Cited

U.S. PATENT DOCUMENTS

| | | | |
|---|---|---|---|
| 5,584,655 A | 12/1996 | Deering | |
| 5,946,981 A * | 9/1999 | Ide et al. | 74/579 R |
| 6,604,907 B1 * | 8/2003 | Lehnhoff | 416/156 |
| 2008/0292462 A1 * | 11/2008 | Munch | 416/153 |

FOREIGN PATENT DOCUMENTS

| | | | | |
|---|---|---|---|---|
| DE | 10 2005 051 912 A1 | | 5/2007 | |
| DE | 102008055473 | * | 6/2010 | F03D 7/02 |
| EP | 1995453 A1 | * | 11/2008 | F03D 7/02 |
| GB | 2 159 584 A | | 12/1985 | |
| WO | WO-2008/068373 A1 | | 6/2008 | |
| WO | WO 2008068373 A1 | * | 6/2008 | |
| WO | WO 2010063562 A2 | * | 6/2010 | |

OTHER PUBLICATIONS

International Search Report (in German with English translation) and Written Opinion (in German) for PCT/EP2010/064699, mailed Jan. 21, 2011; ISA/EP.

* cited by examiner

ROTOR FOR A WIND TURBINE

CROSS-REFERENCE TO RELATED APPLICATIONS

This application is a 371 U.S. National Stage of International Application No. PCT/EP2010/064699, filed Oct. 3, 2010, and claims priority to German Patent Application No. 10 2009 045 467.5, filed Oct. 7, 2009, the disclosures of which are incorporated by reference in their entirety.

DESCRIPTION

The invention relates to a rotor for a wind turbine, having a rotor hub, having at least one rotor blade rotatably mounted on the rotor hub about a blade axis, having at least one threaded spindle mechanism which is positioned between the rotor hub and the rotor blade and which is connected both to the rotor hub and to the rotor blade, wherein the rotor blade is or can be rotated relative to the rotor hub about the blade axis by means of an actuation of the threaded spindle mechanism.

DE 10 2005 051 912 A1 discloses an arrangement for mounting at least three rotor blades, comprising a rotor blade mounting for pivoting the rotor blades about their respective main axes, which is designed such that the main axis of one of the rotor blades has a point of intersection with the main axes of each of the other two, wherein the two points of intersection are spaced apart. The rotor blade is designed in an area of the rotor blade mounting for rotating the rotor blade with means with which transmission means are intended to engage, which can be driven by drive means, comprising a screw drive or a ball screw drive.

DE 199 48 997 A1 describes a blade individual adjustment for wind turbines comprising two drives positioned on at least two sections that can move in relation to one another of a swing arm arranged substantially in the plane of intersection of the blade connection generating a linear extension, wherein each end of the swing arm is provided via a swivel connection with a force-transmitting pivot joint to the hub and an element on the blade to be adjusted. The linear drive with lower travel is designed for example as an electrically operated spindle drive.

U.S. Pat. No. 5,584,655 describes a wind turbine with a rotor blade which is rotatably mounted on a rotor hub about its longitudinal axis. The torsional angle of the rotor blade can be adjusted with a hydraulic cylinder, which at one end is hinged to the rotor hub and at the other to the rotor blade by means of a lever. Instead of the hydraulic cylinder a threaded spindle mechanism, a linear motor and so on can be used.

Threaded spindle mechanisms, which are used in blade angle adjustment drives of the rotors of wind turbines are subject to not inconsiderable wear and therefore must be exchanged more frequently which is associated with material costs, installation costs and costs for the turbine downtime On this basis the object for the invention, for a rotor of the kind mentioned at the outset, is to be able to reduce the costs associated with the wear of the at least one threaded spindle mechanism.

According to the invention this object is achieved by a rotor according to claim 1. Preferred developments of the invention are given in the subclaims.

The rotor according to the invention for a wind turbine comprises a rotor hub, having at least one rotor blade rotatably mounted on the rotor hub about a blade axis, having at least one threaded spindle mechanism which is positioned between the rotor hub and the rotor blade and which is connected both to the rotor hub and to the rotor blade, wherein the rotor blade is or can be rotated relative to the rotor hub about the blade axis by means of an actuation of the threaded spindle mechanism, and wherein the threaded spindle mechanism has a drive, an actuating element, a spindle nut detachably coupled to the actuating element, and a threaded spindle which is rotatable about the longitudinal axis thereof by means of the drive and which is detachably coupled to the drive, such that the threaded spindle and the spindle nut are separable from the threaded spindle mechanism.

It transpires that with a threaded spindle mechanism used as a blade angle adjustment drive, the wear mainly occurs on the threaded spindle and on the spindle nut. Through the design according to the invention of the rotor the threaded spindle is replaceable along with the spindle nut, without having to demount and/or replace the entire threaded spindle mechanism. Installation costs can thereby be saved. This also allows material costs to be saved since other components of the threaded spindle mechanism, such as the drive, can continue to be used.

The threaded spindle and the spindle nut form an assembly that is in particular positioned between the drive and the actuating element. The threaded spindle is preferably together with the spindle nut, that is to say preferably the component as a unit, separable from the threaded spindle mechanism. The threaded spindle in particular has a screwed connection with the spindle nut. The spindle nut is preferably screwed onto the threaded spindle or the threaded spindle is screwed into the spindle nut.

According to a development of the invention the threaded spindle is arranged externally to the drive. Thus for the drive a conventional electric motor can be used, so that the costs of the threaded spindle mechanism can be kept comparatively low. The feature whereby the threaded spindle is arranged externally to the drive is understood in particular to mean that the drive and threaded spindle are arranged separately and/or spatially separated from one another. However, this does not preclude the threaded spindle and the drive preferably having a close physical proximity to one another. The drive comprises in particular a drive shaft, by means of which the threaded spindle can be rotated about its longitudinal axis.

The threaded spindle is preferably detachably fixed to a shaft, which by means of the drive is rotatable about the longitudinal axis. In particular the threaded spindle is fixed in a detachable manner by at least one securing means to the shaft. The securing means is or comprises for example at least a screw, at least a threaded bolt and/or at least a securing bolt. According to a configuration of the invention the shaft and the threaded spindle each have a flange, wherein the two flanges are detachably fixed to one another, in particular by the at least one securing means. The flanges are preferably circular or ring-shaped and/or cylindrical. Each of the flanges is preferably provided with a hole, which aligns with a hole in the respective other flange, wherein the or a securing means engages with the holes in alignment with one another. The flanges are preferably connected together with a form-fit by the at least one securing means. In particular the flanges are screwed together by the at least one securing means. As a result of the detachable securing the threaded spindle can be separated from the shaft and thus also from the drive. The assembly made up of the threaded spindle and the spindle nut is in particular positioned between the shaft and the actuating element.

The threaded spindle can be coupled directly with the drive and/or with the shaft. According to a first variant of the invention the shaft is thus the drive shaft of the drive or is connected between the drive shaft of the drive and the threaded spindle. The threaded spindle mechanism preferably has a gear mechanism, however, wherein the threaded spindle and/or the shaft are coupled with the drive through the intermediary of the gear mechanism. According to a second variant of the invention therefore the shaft is a drive shaft of the gear mechanism or connected between the drive shaft of the gear mechanism and the threaded spindle. In the latter case the drive shaft is preferably coupled with the shaft. The gear mechanism preferably comprises a gear drive, a planetary gear, a chain drive and/or a belt drive or is designed as a gear drive, planetary gear, chain drive and/or belt drive.

By means of the drive the threaded spindle and/or the shaft is rotatable about its longitudinal axis. Furthermore, the drive shaft is for example directly or through the intermediary of the gear mechanism and/or the shaft coupled with the threaded spindle. In particular the drive is an electrical drive and preferably comprises one or at least one electric motor. In this case the drive shaft is preferably the motor shaft of the electric motor. The drive preferably has at least one stator and at least one rotor which is rotatable relative thereto, which rotor is coupled to the drive shaft (motor shaft) in a torque-proof manner and preferably sits on this. The feature by which the threaded spindle is arranged externally to the drive here in particular means that the threaded spindle is arranged externally to the assembly formed by the stator and rotor and/or externally to the assembly formed by the stator, rotor and drive shaft.

The rotor hub and the rotor blade in particular and in each case form a component, wherein the actuating element is mounted on a first component and the threaded spindle and/or the shaft is/are mounted on a second component. According to a development of the invention the actuating element is mounted in an articulated manner on the first component and/or the threaded spindle and/or the spindle is/are mounted in an articulated manner on the second component, so that tilting of the threaded spindle mechanism can be prevented. The actuating element is preferably pivotably and/or rotatably mounted on the first component. Furthermore, the threaded spindle and/or the shaft preferably is/are pivotably and/or rotatably mounted in the second component. The threaded spindle is in particular rotatably mounted about its longitudinal axis on the second component. The components can in each case be single- or multi-part.

The threaded spindle and/or the shaft is/are preferably mounted by means of a support on the second component. According to a configuration of the invention the spindle nut can also be mounted by means of the support on the second component. The actuating element is preferably guided in a displaceable manner on the support.

The support comprises or forms preferably a housing in which the spindle nut and the threaded spindle are arranged. In this way the threaded spindle and the spindle nut can be protected from contamination and moisture. The housing is preferably provided with an access opening, through which the threaded spindle and/or the threaded nut are accessible and also in particular replaceable. Furthermore, the housing preferably has a cover which covers the access opening, which cover can be removed from the housing or moved relative thereto and thus opened, so that the access opening is releasable by opening the cover. In the closed state, the cover covers the access opening preferably in a sealed manner. In particular the actuating element is arranged in or at least partially in the housing. Preferably the actuating element protrudes from the housing. Preferably the shaft is also arranged in or at least partially in the housing.

According to a configuration of the invention a lubricant is introduced into the housing, which is in particular fluid. The lubricant can preferably flow freely within the housing, in which the threaded spindle is also arranged. When the rotor rotates about the rotor axis the threaded spindle mechanism also rotates about the rotor axis, so that an automatic lubrication of the threaded spindle and/or the threaded spindle mechanism with the lubricant takes place. The lubricant is formed for example by an oil or the like.

The support is in particular mounted in an articulated manner on the second component, preferably pivotably and/or rotatably. In this way the articulated mounting of the threaded spindle and/or the shaft on the second component can be performed. The articulated mounting of the support on the second component takes place for example about at least one axis of articulation, which in particular runs perpendicularly to the longitudinal axis of the threaded spindle. According to a development of the invention the articulated mounting of the support on the second component takes place about at least two axes of articulation which in particular run perpendicularly to the longitudinal axis of the threaded spindle and perpendicularly to each other. The articulated mounting of the actuating element on the first component takes place for example about at least one axis of articulation, which in particular runs perpendicularly to the longitudinal axis of the threaded spindle. Preferably the articulated mounting of the actuating element on the first component however takes place about at least two axes of articulation, which in particular run perpendicularly to the longitudinal axis of the threaded spindle and perpendicularly to one another.

The actuating element is in particular mounted on the rotor blade and the threaded spindle and/or the shaft and/or the support is in particular mounted on the rotor hub, so that the first component is formed by the rotor blade and the second component by the rotor hub. An inverse arrangement is also possible however, so that the second component is formed by the rotor blade and the first component is formed by the rotor hub.

A tilting of the threaded spindle mechanism can on the one hand take place in a cross-sectional plane of the rotor blade and on the other hand however also perpendicularly thereto. Preferably the actuating element is mounted in an articulated manner by means of a first articulation on the first component and/or the support is mounted in an articulated manner by means of at least a second articulation on the second component, wherein each articulation has one, two or at least two rotational degrees of freedom. Each articulation can for example be a universal joint, a ball joint, a swivel joint or an elastomer bearing. The first articulation can also have a different design to the second articulation.

Preferably the support is mounted in an articulated manner on the second component by means of at least one elastomer bearing. The or each elastomer bearing preferably comprises an inner part, an outer part surrounding the inner part and an elastomer body surrounding the inner part and sitting within the outer part, by means of which the inner part is connected to the outer part. The elastomer has a bonded, friction or sliding connection with the inner part. The elastomer body also has a bonded, friction or sliding connection with the outer part. The inner part preferably has a fixed connection with the support and the outer part with the second component. In particular the inner part is rigidly connected with the support and/or is integrally designed with this. Alternatively, however, the outer part can also have a fixed connection with the support and the inner part with the second component. The outer part is preferably a sleeve. Additionally or alternatively the outer part can be formed by the second component or the support. According to a development of the invention the actuating element is mounted by means of at least one elastomer bearing on the first component. Elastomer bearings are low maintenance and have a relatively long service life. In particular elastomer bearings offer the advantage that as a rule they do not require lubrication.

The threaded spindle and/or the shaft is/are preferably rotatably mounted on the support by means of at least one bearing about the longitudinal axis. In particular the at least one bearing is a rolling bearing. Alternatively, however, the bearing can also be designed as a sliding bearing. The bearing is preferably provided on the support. According to a development of the invention the threaded spindle and/or the shaft is/are secured or fixed on the bearing or on an additional bearing in the axial direction. Here the axial direction means in particular the direction of the longitudinal axis of the threaded spindle and/or of the shaft.

The at least one bearing and/or the drive and/or the gear mechanism is/are preferably secured to the support. In this way undesired changes in clearance between the drive and the threaded spindle can be avoided. Preferably the additional bearing is also secured to the support, where present.

The threaded spindle mechanism preferably has a position encoder, by means of which for example the rotation of the rotor blade relative to the rotor hub is or can be determined. In particular the threaded spindle, preferably through the intermediary of the shaft, is connected with the position encoder. A gear shaft or a drive shaft can also be connected with the position encoder, however.

The actuating element is preferably designed as a tube or at least partially hollow. The hollow design of the actuating element has the advantage that the threaded spindle can penetrate the hollow space of the actuating element.

According to a development of the invention the spindle nut is secured to the actuating element by means of a screw connection. Since the screw connection is detachable, the spindle nut can be removed from the actuating element, so that the spindle nut is detachably coupled with the actuating element. In particular the actuating element has an internal thread, which engages with an external thread provided on the spindle nut. Additionally or alternatively the spindle nut and the actuating element can however be connected with each other or secured to one another by screws or bolts. Preferably the connection between the spindle nut and the actuating element can be secured against detachment by a locking pin, preferably with a form-fit. The locking pin engages for example in a recess provided in the spindle nut or penetrates this recess. The locking pin also engages for example in the recess provided in the actuating element or penetrates this recess.

The threaded spindle and the spindle nut preferably form a roller screw drive and are designed accordingly. In this way high forces can be transmitted at low friction. Further, roller screw drives have a relatively high service life and a high reliability. In particular roller screw drives are serviceable even if the lubrication is inadequate, which offers additional functional security. Preferably the threaded spindle and the spindle nut form a planetary roller screw drive. Such screw drives are, for example, known from a catalogue from the SKF group, publication No 4351 DE-2008-01.

The rotor hub is in particular rotatable about a rotor axis, wherein the blade axis of the rotor blade preferably runs transverse or substantially transverse to the rotor axis.

According to a configuration of the invention the rotor comprises at least one blade angle adjustment drive positioned between the rotor hub and the rotor blade, by means of which the rotor blade is rotatable about its blade axis, wherein the blade angle adjustment drive has the at least one threaded spindle mechanism or is formed thereby. The threaded spindle is detachably secured by means of the at least one securing means in the blade angle adjustment drive, so that the threaded spindle and the associated spindle nut can be separated from the rest of the blade angle adjustment drive.

The rotor can have a plurality of rotor blades, which in each case are rotatably mounted on the rotor hub about a blade axis. Between the rotor hub and the rotor blades in each case at least one threaded spindle mechanism can be positioned and connected both to the rotor hub and also to the respective rotor blade, wherein each of the rotor blades is rotatable relative to the rotor hub about the respective blade axis by actuation of the respective threaded spindle mechanism. Each of the threaded spindle mechanisms can be developed as described.

The invention also relates to a wind turbine with a machine frame and a rotor that is rotatably mounted on the machine frame about a rotor axis and that is driven or can be driven by means of wind power, which rotor is mechanically coupled to an electrical generator which is or can be driven by the rotor. The rotor is preferably a rotor according to the invention which can be developed according to all the stated configurations. By means of the threaded spindle mechanism the at least one rotor blade is rotatable relative to the rotor hub about its blade axis and as a result the rotary speed of the rotor and thus preferably also the rotary speed of the generator can be varied.

The invention likewise relates to the use of a rotor to vary the rotor speed of a wind turbine with a machine frame, on which a rotor is rotatably mounted about a rotor axis and which is driven by wind power and mechanically coupled to an electric generator, which is driven by the rotor. The rotor is preferably a rotor according to the invention, which can be developed according to all the stated configurations. In particular by actuation of the threaded spindle mechanism the at least one rotor blade is rotated relative to the rotor hub about its blade axis, so that the rotary speed of the rotor and thus preferably also the rotary speed of the generator changes.

The invention is described in the following with the help preferred embodiments by reference to the drawing. The drawing shows as follows.

Figure 1:
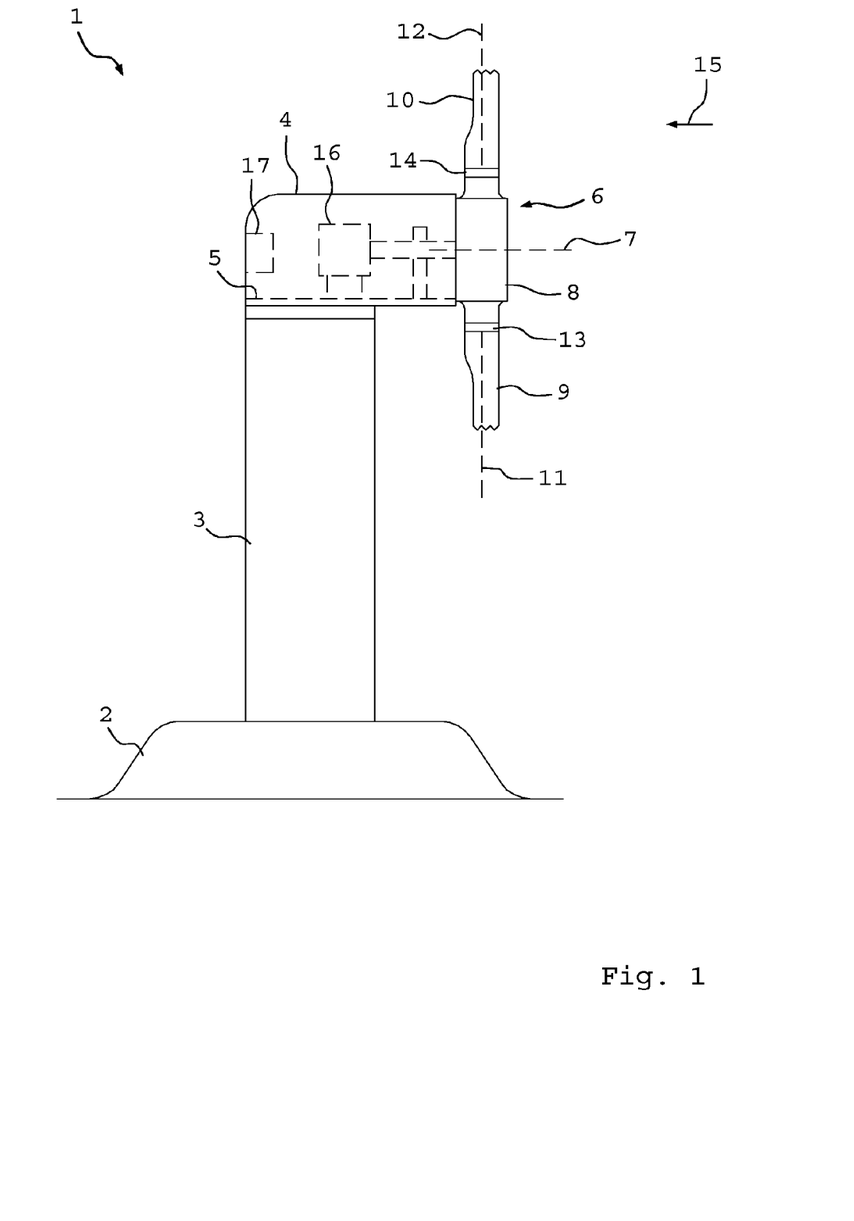
FIG. 1 a schematic representation of a wind turbine with a rotor according to the invention.

FIG. 1 shows a wind turbine 1, wherein a tower 3 standing on a foundation 2 is connected at its end turned away from the foundation 2 with a machine housing 4. In the machine housing 4 a machine frame 5 is arranged, on which a rotor 6 is mounted rotatable about an axis of rotation 7 having a rotor hub 8 and rotor blades 9 and 10 connected therewith, which in each case are rotatable relative to the rotor hub 8 about their blade axis 11 or 12. Each rotor blade 9, 10 is mechanically coupled to an adjustment drive 13 or 14, by means of which the respective rotor blade 9, 10 can be rotated about the associated blade axis 11, 12. The rotor 6 is rotated by wind power 15 about the axis of rotation 7 and is mechanically coupled to an electric generator 16, which is arranged in the machine housing 4 and is secured to the machine frame 5. For controlled operation of the wind turbine 1 a wind turbine controller 17 is provided by means of which inter alia the adjustment drives 13 and 14 are controlled.

Figure 2:
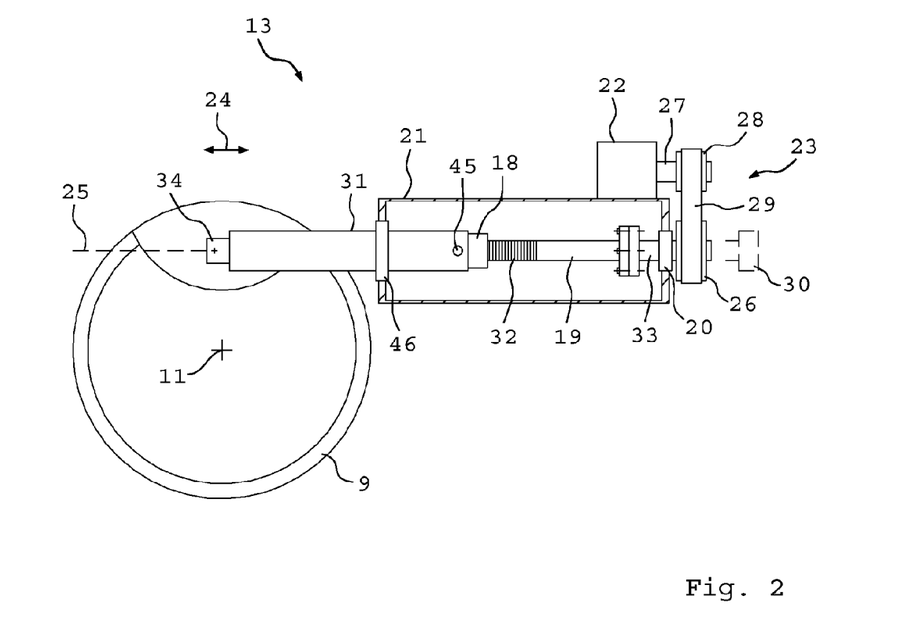
FIG. 2 a schematic and partial sectional top view of an adjustment drive according to a first embodiment of the invention.

FIG. 2 shows a partial sectional top view of the adjustment drive 13 shown in FIG. 1 according to a first embodiment of the invention, comprising a threaded spindle mechanism. The adjustment drive 13 has a spindle nut 18, which is articulated by means of an actuating element 31 with the rotor blade 9. In the spindle nut 18 a threaded spindle 19 having an external thread 32 is screwed which is connected with a shaft 33 in a torque-proof manner. The shaft 33 is rotatably mounted about its longitudinal axis 25, which coincides with the longitudinal axis of the threaded spindle 19, by means of a bearing 20 on a support 21 designed as a housing and is preferably secured in the axial direction. An electrical drive 22 is secured to the support 21 and coupled by means of a gear mechanism 23 with the shaft 33, so that this by means of the drive 22 is or can be rotated about its longitudinal axis 25. Through the torque-proof connection of threaded spindle 19 with the shaft 33 the threaded spindle 19 is also rotatable about the longitudinal axis 25. The drive 22 preferably comprises an electric motor and has for example a rated speed of between 3600 and 4800 revolutions per minute. The gear mechanism 23 is designed as a belt drive and has a belt pulley 26 that sits in a torque-proof manner on the shaft 33, a belt pulley 28 that is connected in a torque-proof manner with the drive 22 and a belt 29 which sits on both belt pulleys 26 and 28. The shaft 33 simultaneously forms the drive shaft 50 (see FIG. 4) of the gear mechanism 23. It is, however, possible for the drive shaft 50 to be designed as a separate component, which is coupled in a torque-proof manner with the shaft 33. The gear mechanism preferably forms a synchronous belt drive and for example has a gear ratio of 1:4. Alternatively the gear mechanism 23 can be designed as a chain drive, wherein the belt pulleys 26 and 28 are in each case replaced by a chain wheel and the belt 29 replaced by a chain. Optionally a position encoder 30 sits on the support 21 coupled to the shaft 33 and emits or can emit an electrical signal to the wind turbine controller 17 that is characteristic of the rotation of the shaft 33.

The spindle nut 18 is not rotatable about the axis 25, in particular since it is coupled by means of the actuating element 31 with the rotor blade 9. Additionally or alternatively the spindle nut 18 and/or the actuating element 31 can also be secured on the support 21 against rotation around the axis 25. If the threaded spindle 19 is now rotated about the axis 25, then the spindle nut 18 displaces with the actuating element 31 along the axis 25, resulting in a rotation of the rotor blade 9 about the blade axis 11 relative to the blade hub 8. If the direction of rotation of the threaded spindle 19 is reversed, then the spindle nut 18 is displaced together with the actuating element 31 in the opposite direction along the axis 25 resulting in a rotation of the rotor blade 9 about the blade axis 11 in the opposite direction. The opposing directions in which the spindle nut 18 together with the actuating element 31 moves along the axis 25 are shown by the double arrow 24.

In the housing 21 a fluid lubricant 51 (see FIG. 6) is introduced. Since when the rotor 6 rotates about the axis of rotation 7 the adjustment drive 13 also rotates, an automatic lubrication of the threaded spindle 19 takes place.

Figure 3:
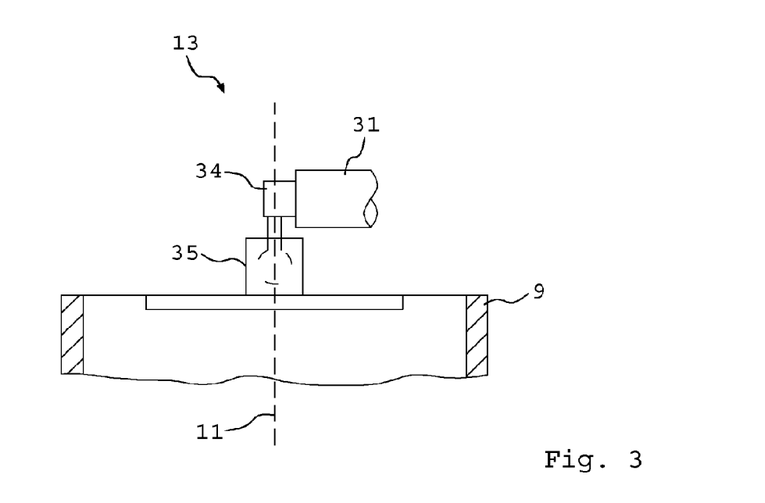
FIG. 3 a schematic and partial side view of the adjustment drive according to FIG. 2.

FIG. 3 shows a partial side view of the adjustment drive 13, wherein it can be seen that the actuating element 31 at its end turned away from the spindle nut 18 has a connection piece 34 which is connected by means of an articulation 35 formed here as a universal joint with the rotor blade 9.

Figure 4:
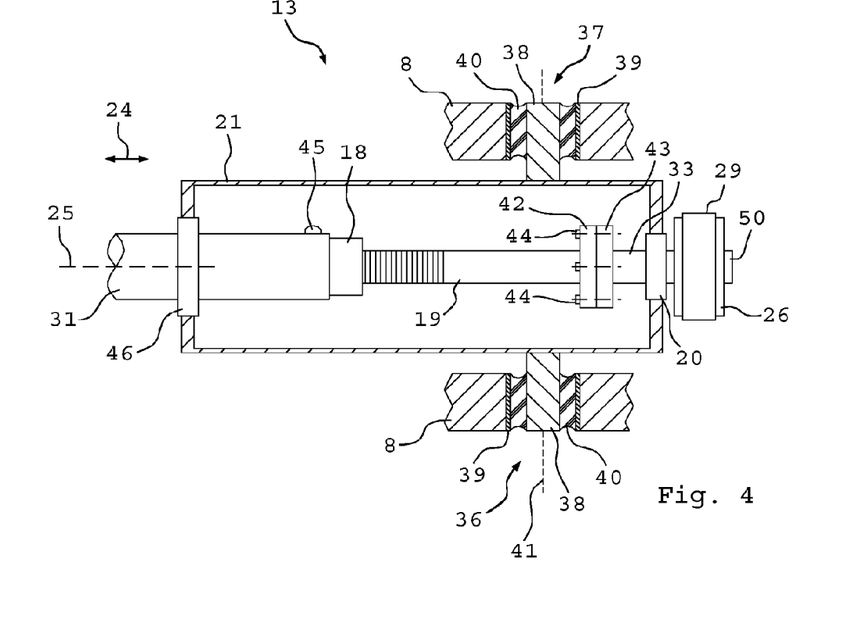
FIG. 4 a schematic and partial sectional side view of the threaded spindle mechanism according to FIG. 2.

FIG. 4 is a partial sectional side view of the threaded spindle mechanism showing how the support 21 by means of two elastomer bearings 36 and 37 is connected to the rotor hub 8. Each elastomer bearing comprises an inner part 38 rigidly connected to the support 21, an outer sleeve 39 surrounding the inner part 38 and an elastomer body 40 surrounding the inner part 38 and arranged in the outer sleeve 39, by means of which elastomer body 40 the inner part 38 is connected to the outer sleeve 39. Alternatively the outer sleeve can be dispensed with so that the elastomer body 40 sits directly in a recess provided in the rotor hub 8. The elastomer bearings 36 and 37, allow a pivoting of the support 21 about a swivel axis 41 which here runs perpendicularly to the longitudinal axis 25 and parallel to the blade axis 11. In addition the elastomer bearings to a limited extent allow damped movements in other directions, in particular translational movements and/or tilting movements. Jamming of the adjustment drive can thus be counteracted. Furthermore, the elastomer bearings are as a rule low-maintenance and have a long service life. Additionally, it is pointed out that the articulation 35 can also be designed as an elastomer bearing.

At its end turned towards the shaft 33 the threaded spindle 19 has a flange 42 which is connected in a torque-proof manner with a flange 43 provided on an end of the shaft 33 turned towards the threaded spindle 19 by means of detachable securing means 44 which preferably is designed as threaded bolts. The flange 42 is rigidly connected to the threaded spindle 19 and the flange 43 is rigidly connected to the shaft 33, so that a rotational movement of the shaft 33 about the longitudinal axis 25 can be transferred to the threaded spindle 19. The threaded spindle 19 can be separated from the shaft 33 by detaching the securing means 44.

Figure 5:
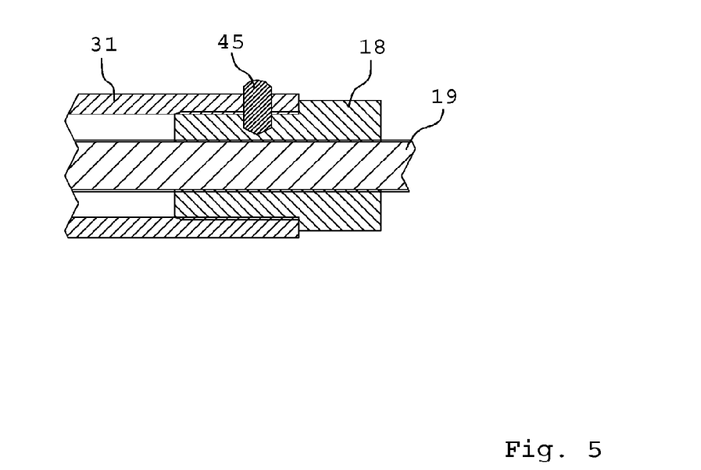
FIG. 5 a schematic and partial sectional view of the actuating element and the spindle nut according to FIG. 2 along the axis of rotation of the threaded spindle.

The spindle nut 18 is screwed into the actuating element 31 and by means of a locking pin 45, which passes through the wall of the actuating element 31 and engages in a hole provided in the spindle nut 18, is secured to the actuating element 31 (see FIG. 5). In order to detach the spindle nut 18 from the actuating element 31 the locking pin 45 is removed or at least disengaged from the spindle nut 18 so that the spindle nut 18 can be screwed out of the actuating element 31. In this way the spindle nut 18 is separable from the actuating element 31. The actuating element 31 is designed as a tube, which by means of a guide 46 can be movably guided on the support 21 in the direction of the arrow 24.

FIG. 5 shows a partial sectional view of the actuating element 31 along the longitudinal axis 25, so that the principle of securing the spindle nut 18 to the actuating element 31 by means of the locking pin 45 is clear. It is clear to a person skilled in the art that the locking pin 45 can basically also then hold the spindle nut 18 in a torque-proof manner and secure it axially on the actuating element 31 if the spindle nut 18 and the actuating element 31 are connected together without screwing. Furthermore a plurality of locking pins can be provided around the longitudinal axis 25.

Figure 6:
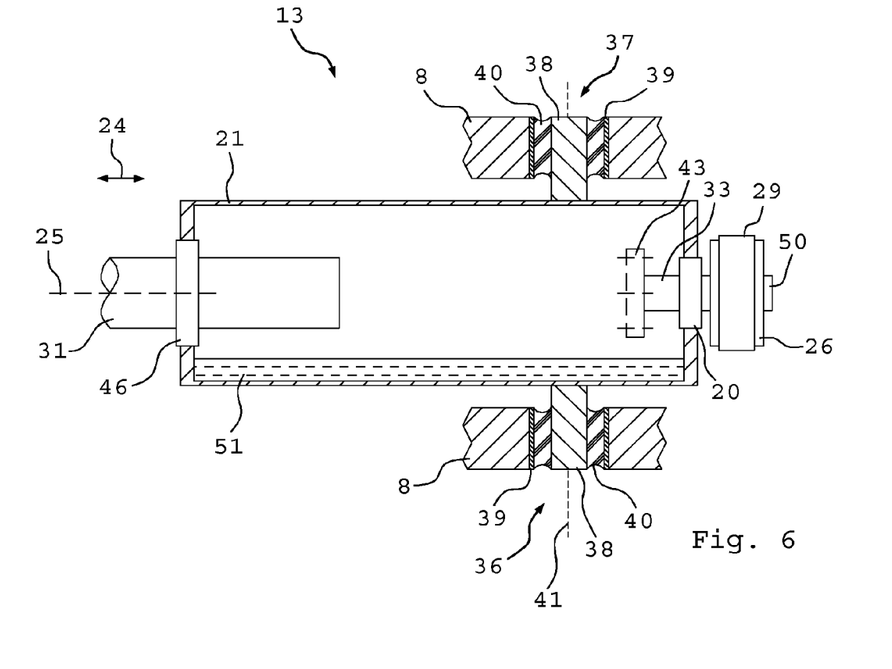
FIG. 6 the side view according to FIG. 4 with the demounted threaded spindle.
Figure 7:
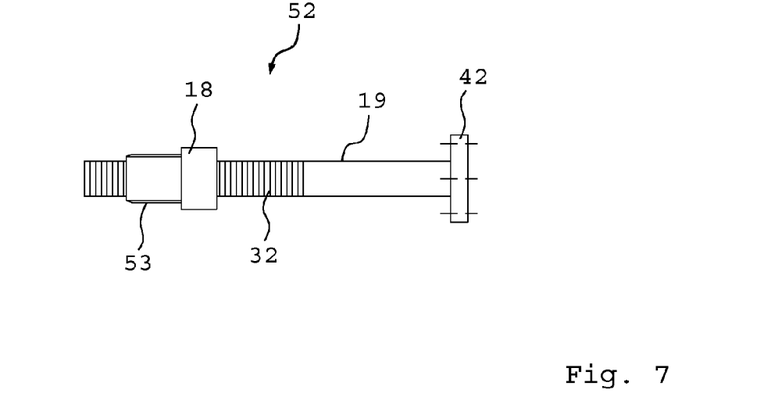
FIG. 7 a side view of the demounted threaded spindle.

FIG. 6 shows a partial sectional side view of the adjustment drive 13, wherein the locking pin 45 has been removed and the threaded spindle 19 and the spindle nut 18 have been demounted. The demounted assembly 52 consisting of threaded spindle 19 and spindle nut 18 is shown in FIG. 7, with reference 53 designating the outer thread of the spindle nut 18 by means of which the latter can be screwed into the actuating element 31.

Figure 8:
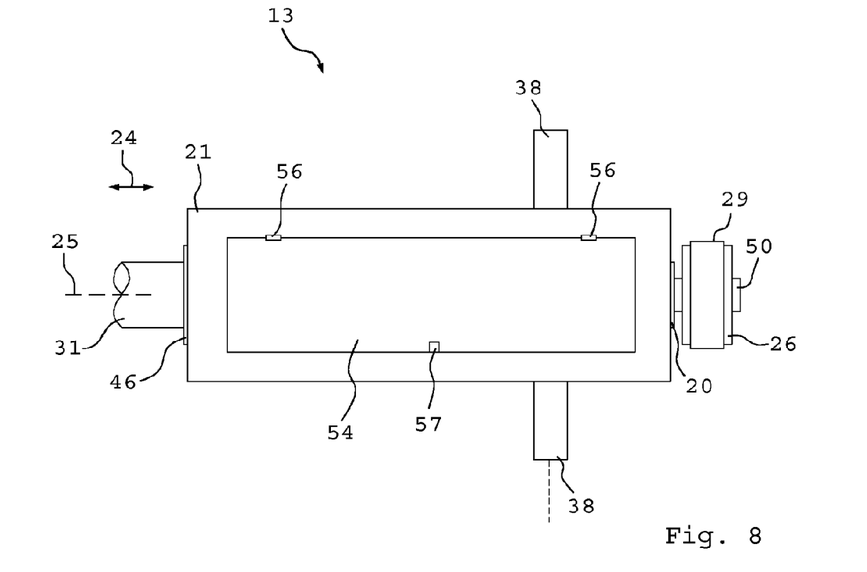
FIG. 8 a schematic side view of the threaded spindle mechanism in the closed state of the housing.
Figure 9:
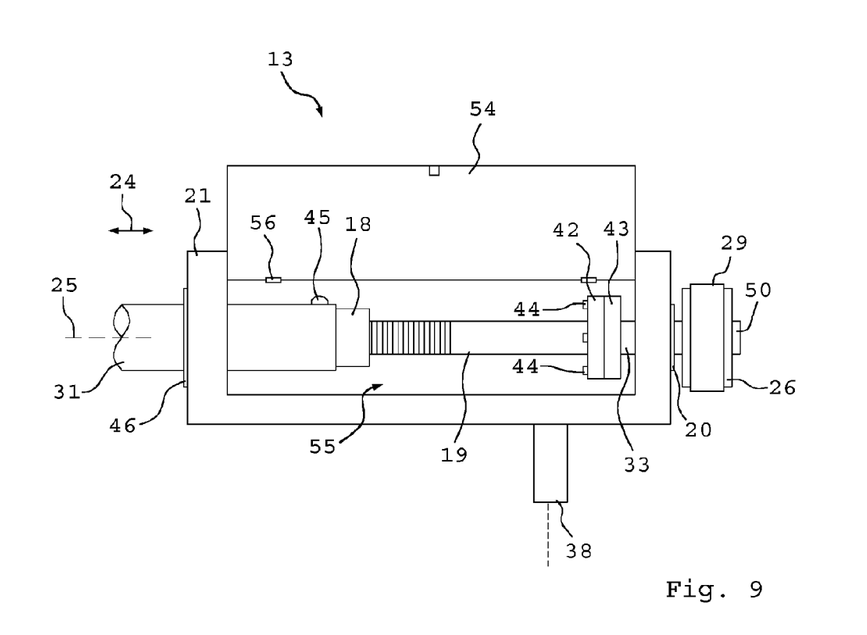
FIG. 9 a schematic side view of the threaded spindle mechanism in the open state of the housing.

FIG. 8 shows a partial side view of the adjustment drive 13 wherein a cover 54 covers an opening 55 (see FIG. 9) of the housing 21. The cover 54 is mounted pivotably on the housing 21 by hinges 56 and is thus formed as a flap, such that by pivoting the cover 54 the housing opening 55 is releasable. Alternatively the cover 54 can also be removable, so that the hinges can be dispensed with. In the closed state of the cover 54 shown in FIG. 8 the cover 54 seals the opening 55 tightly, so that no lubricant 51 can escape from the housing 21 and no contamination can enter the housing 21. Furthermore, in the closed state on the housing 21 the cover 54 is secured by a lock 57 against unintentional release or swinging open. In FIG. 9 the lock 57 is released and the cover is swung open, so that the opening 55 is released. In this state maintenance work can be performed on the threaded spindle mechanism. In particular the assembly 52 can be demounted and mounted through the opening 55.

The design of the adjustment drive 14 corresponds to that of adjustment drive 13.

Figure 10:
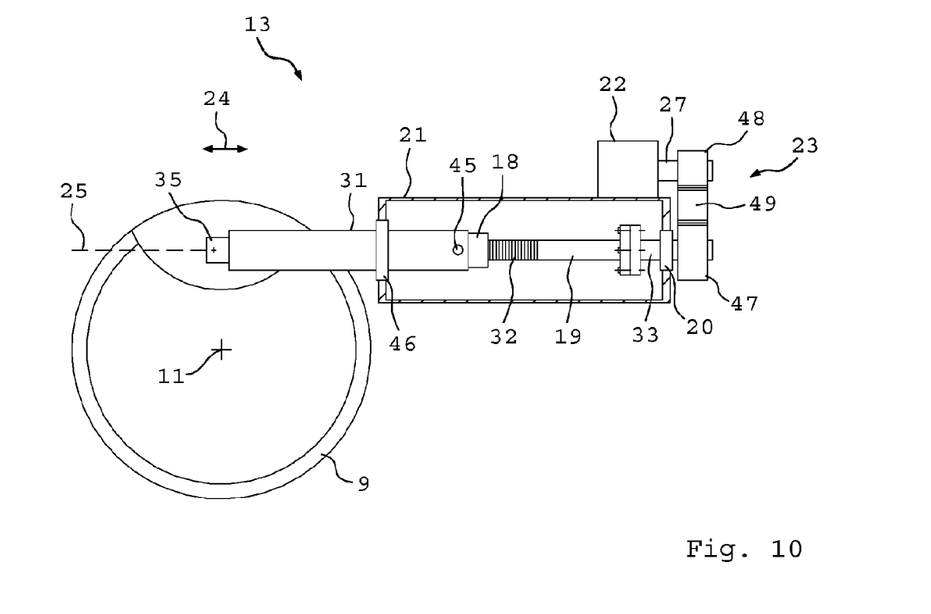
FIG. 10 a schematic top view of an adjustment drive according to a second embodiment of the invention.

FIG. 10 shows a schematic view of the adjustment drive 13 shown in FIG. 1 and designed as a threaded spindle mechanism according to a second embodiment of the invention, wherein features identical or similar to those of the first embodiment are indicated by the same reference numbers as for the first embodiment. Unlike the first embodiment, the gear mechanism 23 is designed as a gear drive and has a gear wheel 47 that sits on the shaft 33 in a torque-proof manner, a gear wheel 48 connected in a torque-proof manner with the drive shaft 27 of the drive 22 and an intermediate gear 49 designed as a gear wheel, which meshes with the gear wheels 47 and 48. For a further description of the second embodiment reference is made to the description of the first embodiment. According to a variation of the second embodiment it is possible to couple the gear wheel 47 directly with the gear wheel 48. In this case the intermediate gear 49 can be dispensed with. According to another variation of the second embodiment it is possible for the gear wheels 47 and 48 to be coupled together through the intermediary of a plurality of gear wheels.

Figure 11:
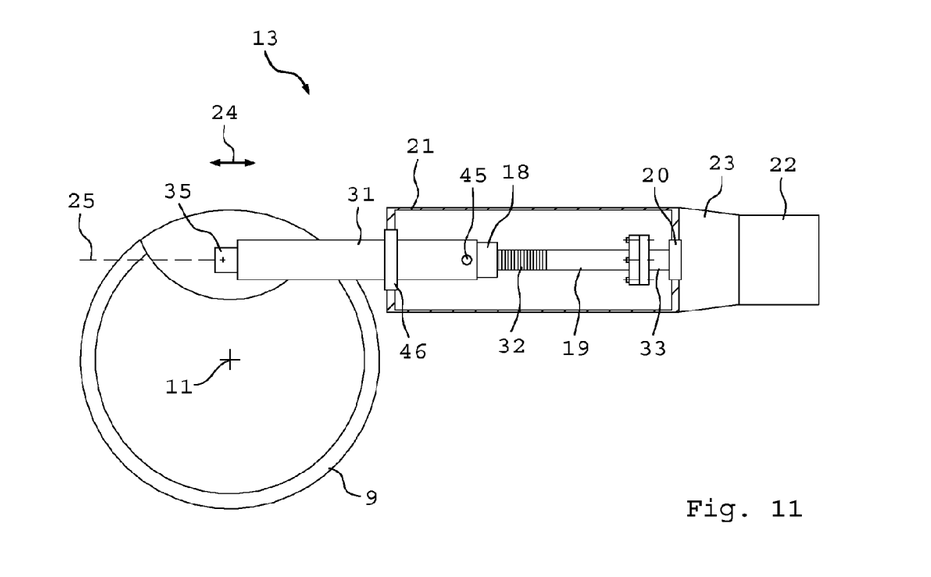
FIG. 11 a schematic top view of an adjustment drive according to a third embodiment of the invention.

FIG. 11 shows a schematic view of the adjustment drive 13 shown in FIG. 1 designed as a threaded spindle mechanism according to a third embodiment of the invention, wherein features identical or similar to those of the first embodiment are indicated by the same reference numbers as for the first embodiment. Unlike the first embodiment, the gear mechanism 23 is designed as a planetary gear, so that the threaded spindle 19, the shaft 33, the gear mechanism 23 and the drive 22 in the direction of the longitudinal axis 25 are arranged one behind the other. Spatially, therefore, a very slim form of the adjusting drive 13 results. The planetary gear is preferably single-stage. For a further description of the third embodiment, reference is made to the description of the first embodiment.

LIST OF REFERENCE NUMERALS

1 Wind turbine
2 Foundation
3 Tower
4 Machine housing
5 Machine frame
6 Rotor
7 Rotor axis
8 Rotor hub
9 Rotor blade
10 Rotor blade
11 Blade axis
12 Blade axis
13 Adjustment drive
14 Adjustment drive
15 Wind
16 Generator
17 Wind turbine controller
18 Spindle nut
19 Threaded spindle
20 Bearing/Rolling bearing
21 Support
22 Electrical drive
23 Gear mechanism
24 Direction of movement of the spindle nut and the actuating element
25 Longitudinal axis/axis of rotation of the shaft and the threaded spindle
26 Belt pulley/chain wheel
27 Shaft of the drive
28 Belt pulley/chain wheel
29 Belt/chain
30 Position encoder
31 Actuating element
32 Outer thread of the threaded spindle
33 Shaft
34 Connection piece of the actuating element
35 Articulation
36 Elastomer bearing
37 Elastomer bearing
38 Inner part
39 Outer sleeve
40 Elastomer body
41 Swivel axis
42 Flange
43 Flange
44 Securing means/threaded bolt
45 Locking pin
46 Guide
47 Gear wheel
48 Gear wheel
49 Intermediate gear
50 Drive shaft of gear mechanism
51 Lubricant
52 Assembly of the threaded spindle and spindle nut
53 Outer thread of the spindle nut
54 Cover
55 Housing opening
56 Hinge
57 Lock

The invention claimed is:

1. A rotor for a wind turbine comprising:
at least one rotor blade;
a rotor hub having the at least one rotor blade rotatably mounted on the rotor hub about a blade axis; and
at least one threaded spindle mechanism positioned between the rotor hub and the rotor blade and connected to the rotor hub and to the rotor blade, the at least one threaded spindle mechanism having a drive, a shaft driven by the drive, an actuating element, a spindle nut detachably coupled to the actuating element, and a threaded spindle rotatable about a longitudinal axis thereof by means of the shaft of the drive and which is detachably coupled to the shaft of the drive, such that the threaded spindle and the spindle nut can be separated from the threaded spindle mechanism;
wherein the rotor blade is adapted for rotation relative to the rotor hub about the blade axis by actuation of the threaded spindle mechanism; and wherein the shaft of the drive and the threaded spindle each include cooperating structure facilitating attaching and detaching of the threaded spindle from the shaft of the drive, so that the threaded spindle and the spindle nut are removable from the threaded spindle mechanism as a single assembly.

2. The rotor according to claim 1, further comprising at least one coupling to enable securing the cooperating structure associated with the shaft and the threaded spindle releasably together to enable the threaded spindle to be driven rotationally by means of the drive.

3. The rotor according to claim 2, wherein the spindle nut is screwed onto the threaded spindle and together with the threaded spindle forms the single assembly, which is positioned between the shaft and the actuating element.

4. The rotor according to claim 3, wherein the rotor blade forms a first component and the rotor hub forms a second component, wherein the actuating element is mounted on one of the components, and the shaft is rotatably mounted on the other one of the first and second components about the longitudinal axis thereof.

5. The rotor according to claim 4, further comprising a support mounting the shaft on the second component.

6. The rotor according to claim 5, wherein the support is formed as a housing, in which the shaft, the threaded spindle, the spindle nut and the actuating element are arranged, which is movably guided on the housing and protrudes therefrom.

7. The rotor according to claim 6, wherein the housing has an access opening covered by a cover, which is releasable by opening the cover such that the threaded spindle and the spindle nut are accessible through the access opening.

8. The rotor according to claim 6, wherein a lubricant is introduced in the housing, so that when the rotor rotates about an axis of rotation an automatic lubrication of the threaded spindle takes place.

9. The rotor according to claim 6, wherein the shaft is mounted in an articulated manner on the second component by the support.

10. The rotor according to claim 6, further comprising at least one elastomer bearing mounting the support on the second component in an articulated manner.

11. The rotor according to claim 10, wherein the elastomer bearing comprises an inner part, an outer part surrounding the inner part and an elastomer body surrounding the inner part and sitting within the outer part, by means of which the inner part is connected to the outer part.

12. The rotor according to claim 11, wherein the inner part has a fixed connection with the support and the outer part has a fixed connection with the second component.

13. The rotor according to claim 5, wherein the actuating element is mounted in an articulated manner on the first component.

14. The rotor according to claim 5, further comprising a threaded connection affixing the spindle nut to the actuating element, and a locking pin preventing detachment thereof.

15. The rotor according to claim 5, further comprising a gear mechanism coupling the shaft with the drive.

16. The rotor according to claim 15, wherein the gear mechanism is selected from the group consisting of a belt drive, a gear drive, a planetary gear or combinations thereof.

17. The rotor according to claim 15, wherein the shaft is coupled to the gear mechanism.

18. The rotor according to claim 17, wherein the shaft is a gear shaft of the gear mechanism.

19. A rotor for a wind turbine comprising:
at least one rotor blade;
a rotor hub having the at least one rotor blade rotatably mounted on the rotor hub about a blade axis;
at least one adjustment drive positioned between the rotor hub and the rotor blade and connected to the rotor hub and to the rotor blade for adjusting an orientation of the rotor blade;
the adjustment including:
a threaded spindle operably associated with the rotor blade for changing an orientation of the rotor blade;
a drive mechanism;
a shaft, driven by the drive mechanism, for imparting rotational movement to the threaded spindle;
the threaded spindle including first cooperating structure;
the shaft including second cooperating structure for mating with the first cooperating structure of the threaded spindle; and
detachable securing components which engage and detachably hold the first and second cooperating structures together to enable the threaded spindle to be driven rotationally by the drive mechanism, but still quickly uncoupled from the shaft to enable easy removal of the threaded spindle in its entirety from the adjustment drive.

20. The wind turbine of claim 19, further comprising;
an actuating element configured to be coupled to the rotor;
a spindle nut for securing an actuating element to the threaded spindle so that rotation of the threaded spindle causes a corresponding rotation of the actuating element;
and wherein the first and second cooperating structures each include a flange having at least one hole therethrough; and
wherein the detachable securing components include threaded fasteners that extend through the flanges to secure the threaded spindle detachably to the shaft.

* * * * *